Aug. 25, 1942.  R. R. POLLOCK  2,294,047
TIRE ABRADING OR BUFFING MACHINE
Filed Sept. 11, 1940   3 Sheets-Sheet 1

Inventor
R. R. Pollock,
By Christian R. Nelsen
Attorney

Aug. 25, 1942.  R. R. POLLOCK  2,294,047
TIRE ABRADING OR BUFFING MACHINE
Filed Sept. 11, 1940  3 Sheets-Sheet 2
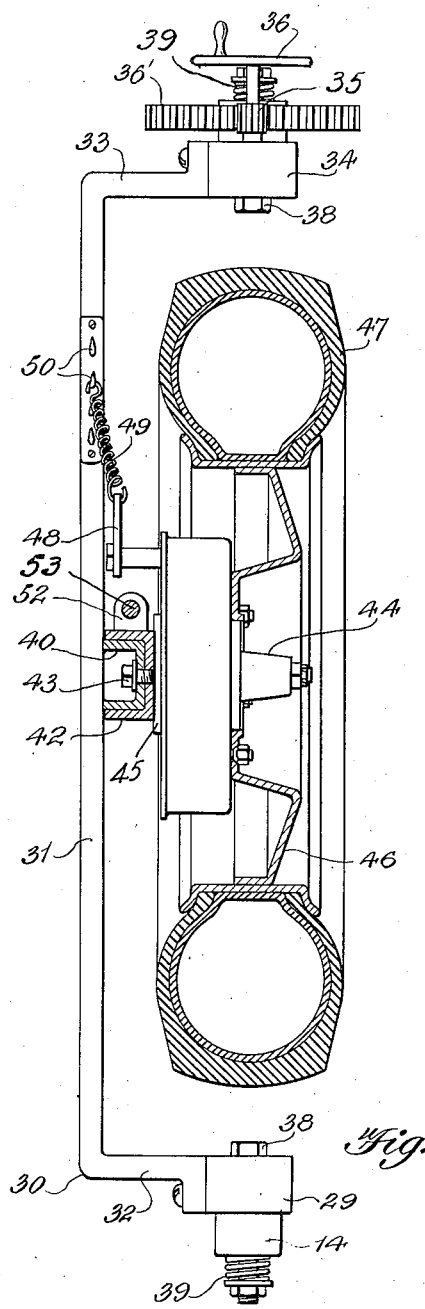
Fig. 2.
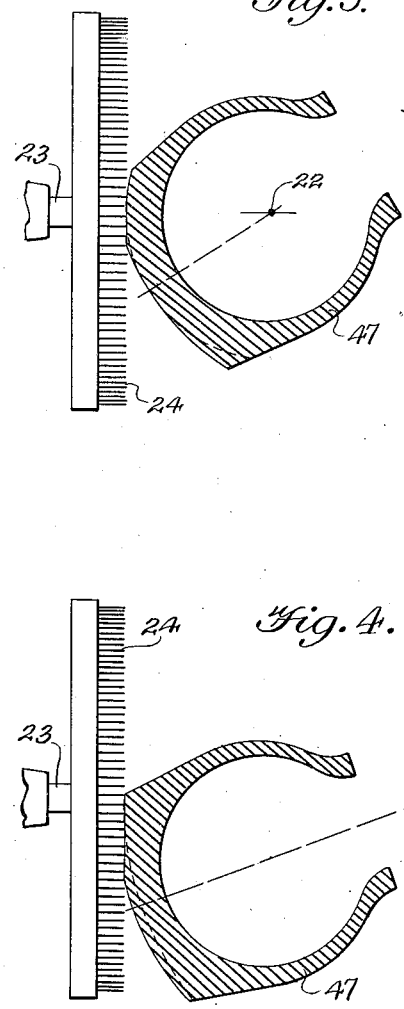
Fig. 3.
Fig. 4.
Inventor
R. R. Pollock,
By Christian R. Nielsen
Attorney

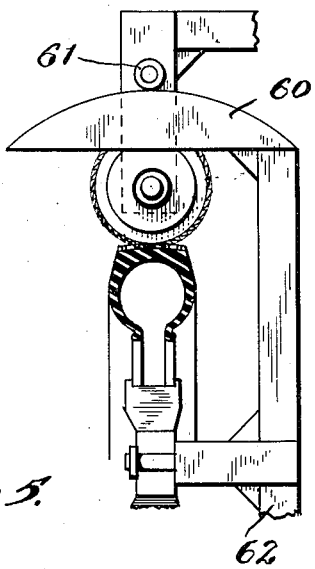
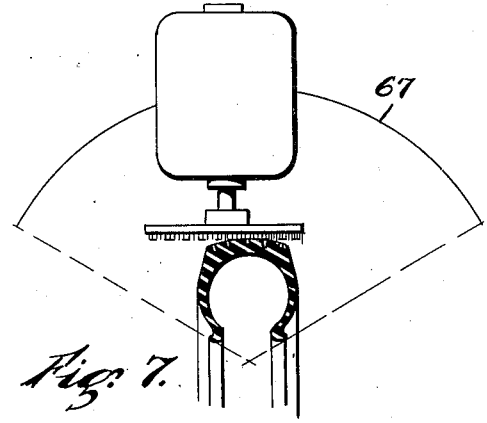
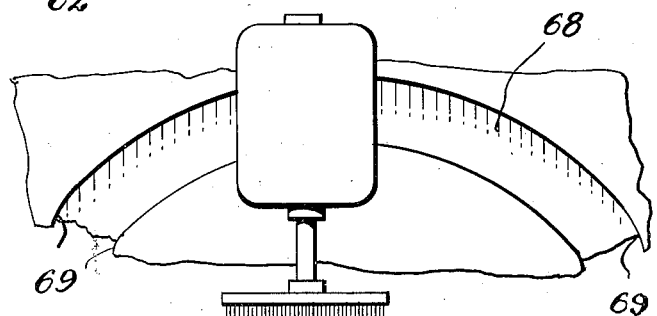
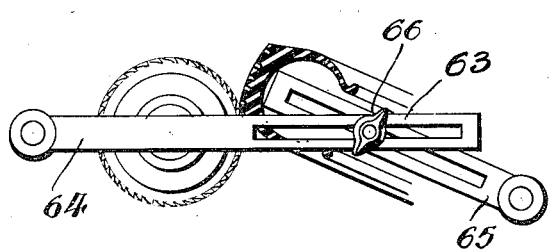

Patented Aug. 25, 1942

2,294,047

UNITED STATES PATENT OFFICE 2,294,047

TIRE ABRADING OR BUFFING MACHINE

Randolph R. Pollock, Lawrenceburg, Tenn.

Application September 11, 1940, Serial No. 356,382

4 Claims. (Cl. 29—76)

This invention has for an object to effect improvements in machines for buffing or dressing tires, and particularly to the so-called "shoe" or casing, of a pneumatic tire, which today comprises a carcass of built-up fabric including rubber-impregnated threads, the shoe being of a general C-shape in cross section, with its two edges adapted to be secured upon the rims of wheels; and the walls covered with a suitable body of elastic rubber; the central part being formed on a thick rubber patterned "tread," adapted to sustain wear and shock of engagement with the road upon which the tire is to travel when incorporated upon a vehicle wheel. A practice has developed in the repair of such tires involving the application of an annular "cap" and commonly known as "retreading." One form of such repair involved the application of a simple "top cap" which is a tread band more or less flat in cross section, so that it does not extend inwardly upon the sides of the tire a material distance. The other is a more complete tread, and may be termed a "crown" tread or camel back cap, since it is higher in its central part and includes tapered edge portions which are intended to extend inwardly upon the sides of the tire a distance. For the application of such retreads, two different treatments of the tire carcass to be repaired are followed; one, where a top cap only is to be applied, involving only the removal of such excess old tread portions of the carcass on the extreme outer peripheral part of the tread of the tire as will afford a proper support for the top cap, the curve formed on the carcass being more or less flat transversely of the tire, for this operation. In the application of a crown or camel back cap, a more extensive removal of old rubber is required, at each side of the tire particularly, because in the wear of the tire, the tread portion becomes considerably flattened and an angular shoulder is formed at each lateral boundary of the road-engaging surface of the tire, which must be removed, including a portion extending inwardly on the side of the tire a short distance.

It is therefore an aim of my invention to present a machine which may be operated to form with great accuracy a new and roughened surface upon a tire carcass tread portion to receive and have secured thereto with the greatest effectiveness a top cap or crown cap, as may be required.

There have been provided a number of machines for stripping tire carcasses in order to provide a new support surface or a retread cap, and it is an objection to those with which I am familiar that where eccentricities have been formed in the carcass by reason of uneven wear of the tire or faults in manufacture, and which when in use upon a vehicle or steering wheel tend to produce "shimmy" therein will also tend to maintain similar eccentricities and faults in contour when dressed upon the prior machines, and may only be corrected by an approximation of correct form by the exercise of the operator's judgment of the form of the tire as observed by him with the unaided eye. It is therefore an important aim of my invention to present a machine which is adapted to form with great accuracy upon a tire shoe a new tread face upon which a cap or retread device may be secured, which new tread face on the carcass will be accurately concentric with the axis of the wheel upon which the shoe will be mounted when in use, and in which the transverse curvature of such new tread surface on the carcass will also be extremely accurate and uniform through the circumference of the tire, and which will not be disturbed in its function by inequalities already formed in the old carcass tread.

It is a particular aim to present a machine which is adapted to buff and remove the shoulder design and prepare with great accuracy a mathematically symmetrical surface, especially that extending on to the side walls, so that a neat fit of the edges of new rubber or "camel-back" tread may be effected with corresponding increased security of repair jobs.

In most shops, buffing is at present done with a cylindrical type of buffer wheel, in which the tire surface is presented to the periphery of the cylindrical member, and it is an aim of my invention to present a disc type of buffer in which the disc rotates in a plane at right angles to the axis of its rotation and is coordinated in a novel way with the tire mounting means, attaining novel function in the operation of the machine as well as presenting a finer tractive surface than is obtained in the ordinary cylinder buffer, as will appear, hereinafter. It especially avoids the possibility of the formation of transverse or longitudinal cuts or grooves in the tire surface whereby the life of the buffer disc is greatly prolonged by avoiding the bending of the tack elements or wire elements in one direction excessively. A special specific object of the invention is to so coordinate the buffer device with the tire and the tire mounting that an automatic feeding of the tire and the tire surfaces to the buffer is attained with great uniformity and certainty, and whereby tendency to heating of the carcass is greatly minimized.

A further aim is to present a novel construction in tire supports and means for moving the same during buffing treatments, and to present a novel coordination of the tire support and mounting of the buffer element to attain great rapidity in adjustment of the device to tires of different sizes and to accommodate the device to different treatments of tire carcasses, particularly with regard to the form to be imparted to the carcass tread surfaces, before the application of the repair cap or retread.

Additional objects, advantages and features of invention reside in the construction, arrangement and combination of parts involved in the embodiment of the invention, as will be more readily understood from the following description and accompanying drawings, wherein Figure 1 is a perspective view of a machine embodying my invention.

Figure 2 is a vertical cross section of a tire and its mounting in the machine.

Figure 3 is a fragmentary cross section taken through a tire mounted in the device, and showing its relation to the buffer wheel.

Figure 4 is a similar view showing a further relation between the buffer wheel and the tire.

Figure 5 is a diagrammatic view illustrating how a curved peripheral surface may be attained.

Figure 6 is a diagrammatic view illustrating means for attaining a curved crown surface.

Figure 7 is a diagrammatic view illustrating a modified construction for mounting the buffing device.

Figure 8 illustrates a modified construction of motor mounting.

Figure 1:
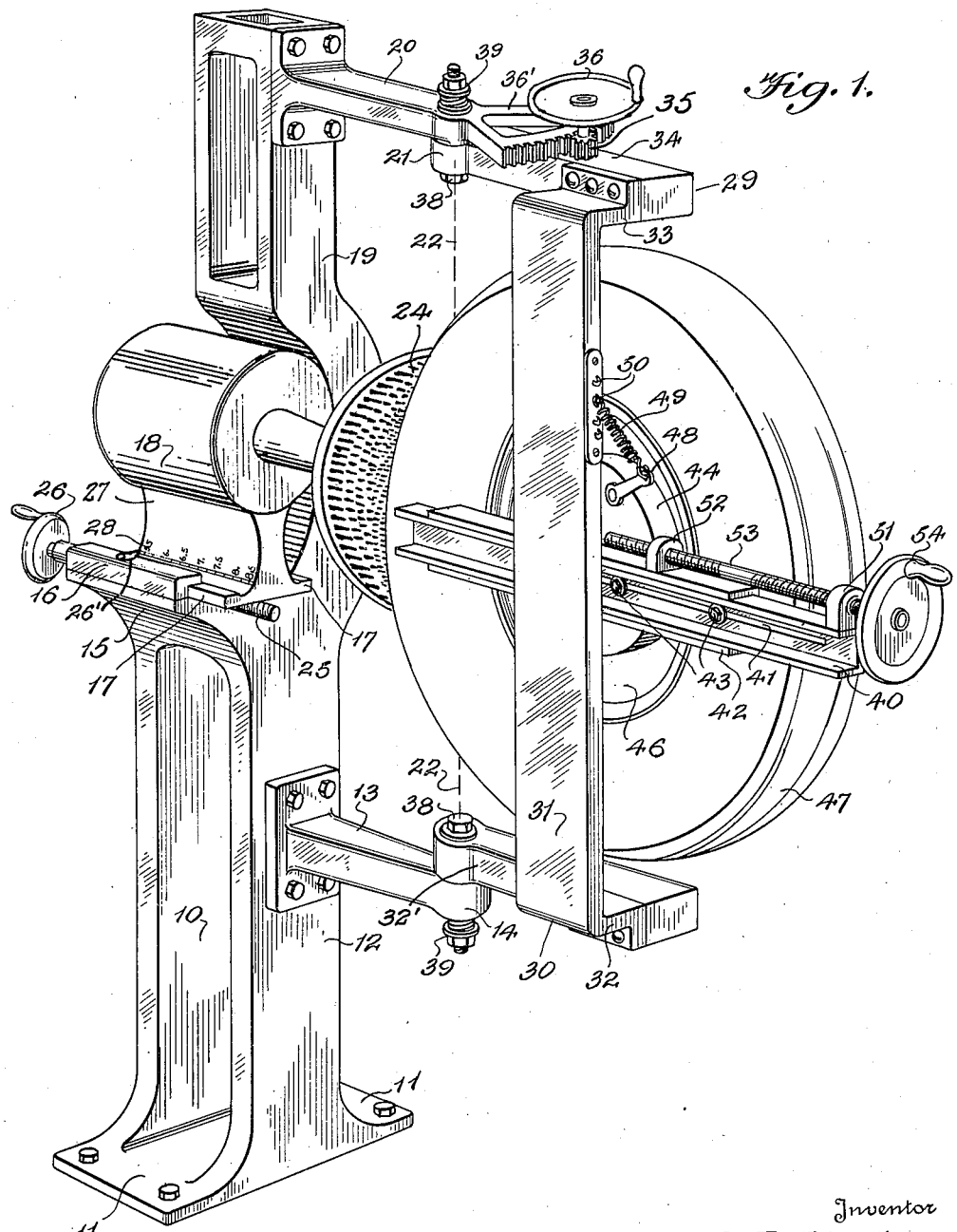

There is illustrated a machine comprising a heavy cast base frame 10, including the foot portion 11 which may be bolted to a floor, including at least one leg 12 adjacent the right hand side having a flat vertical face upon which a pivot arm 13 may be bolted, having a knuckle 14 at its outer end, projecting towards the right in Figure 1. A table portion 15 is formed intermediately of the height of the frame, having a trackway 16 with overhanging rails, between which there is slidable laterally projected foot flange portions 17 of a motor 18, which is thus mounted slidably in the trackway, and held with great firmness in its path by the engagement of the foot flanges in the trackway. The frame 10 is provided with an upper body portion 19 from which there is projected generally toward the right a pivot arm 20, corresponding to the one 13, and having a knuckle portion 21 on a vertical axis common to the knuckle 14, before mentioned. This axis, indicated by the dotted line 22 is spaced a substantial distance to the right from the frame 10, as viewed in Figure 1, and the motor is mounted with its shaft 23 on a horizontal axis which very nearly intersects the axis 22, and the trackway 16 is parallel to the shaft 23, so that the motor is maintained at all times with its shaft upon the same axis.

A buffer disc or backwheel 24 is fixed on the extremity of the shaft 23, which, in the present instance, has a substantial planiform portion extended outwardly and away from the motor, in which there is suitably fixed or fastened a multiplicity of tack or wire elements common in such devices, and which may be secured or fastened thereon in accordance with conventional practices in such buffers.

Means is provided for moving the motor 18 slidably in its trackway, consisting in the present instance of a worm-shaft 25, mounted in the frame 10 parallel to the axis of the motor, and having a hand wheel 26 at its left-hand end, as viewed in Figure 1. On the trackway there is provided a pointer 26', and on the base 27 of the motor, above the foot flanges 17, there is formed a dial or scale 28 related to a range of sizes of tires, particularly with respect to the transverse diameter of such tires, whereby the position of the buffer disc 24 with relation to the axis 22 may be determined and adjusted, and fixed in proper coordination with a given size of tire, the tread portion of which is to be buffed and finished for the reception of a retread cap, or which tire is to be reshaped for any other purpose. A rotating or steering frame 29 is mounted on the knuckles 14 and 21, this frame being constructed for the support revolubly of a tire carcass to be buffed, and being termed a steering frame because of its capability of movement to move the tire mounted thereon in a manner corresponding to that of the steering movement of tires carried upon the steering wheels of a vehicle. The frame 30 comprises essentially in the present instance, a vertical bar 31, from which arms 32 are extended horizontally, being spaced apart vertically a distance sufficient to receive the largest size of tire to be finished freely therebetween, and at the extremities of the arms 31 there are knuckle extensions 32' at the bottom, and 33 at the top, the upper extension including a part 34 extending a distance from the knuckle proper, and having mounted therein a vertical stud shaft and pinion as at 35, a handwheel 36 being mounted on this shaft and pinion for manual rotation thereof. The upper knuckle member 21 on the base frame is formed with an outward extension 36' in the form of a sector having a rack face on its outer edge with which the pinion at 35 is meshed, so that upon rotation of the wheel 36 the frame 30 will be rocked on a vertical axis coincident with the axis 22. The connections between the knuckles 21 and 33 at the upper part of the machine, and the knuckles 14 and 32 at the lower part consist of a usual king bolt 38, with nut and spring washers as at 39, by which sufficient friction is set up between the knuckles 21 and 33 at the top, and the knuckles 14 and 33 at the bottom, to act as a brake upon pivotal movement of the frame 30 and prevent loose movement thereof, as well as preventing too free a swinging movement of the frame on its pivot. Fixed on the vertical member 31 of the frame 30 at the inner side, there is a horizontal channel member 40, positioned below the axis of the motor shaft 23 and having its greater portion extended outwardly from the frame 30 and parallel to the plane in which tires are to be mounted on the machine, this channel member being welded to the vertical member of the frame 30, and comprising a mounting arm for a tire spindle and brake assembly, as will be described. The channel member is formed with a longitudinal slot 41 in its central part, and it is secured to the frame 30 by having the edge portions of the flange members of the channel piece welded to the vertical member 31 of the frame. Slidable on the channel member 40 there is a carriage piece 42, which may be of the same cross sectional form, so as to fit properly upon the channel member, and being held thereto by means of bolts 43 engaged through the slots 41 and in the body of the carriage piece, so as to hold it securely in proper position upon the channel member, and also so that if desired, the carriage piece may be clamped to the channel member at different positions. The carriage member has mounted thereon a spindle, hub and brake assembly, indicated generally at 44, the details of which are not illustrated as they comprise any conventional brake housing, hub and spindle assembly such as are used upon the front steering knuckles of automobiles, and which may be mounted upon the carriage member 42 by welding or otherwise secured thereto with the hub 45 as shown, rotating upon a horizontal axis at right angles to the direction of the channel arm 40. The hub 45 may be fitted with a wheel body 46 of conventional form, detachably secured thereto, in accordance with familiar wheel and hub construction upon automobiles, the wheel being of a conventional form adapted to have a tire 47 mounted thereon, with an inflated tube therein, just as it would be upon the wheel of a vehicle, the details of such tire mounting being well known in various forms and requiring no description here, since it comprises no novel feature of this invention. The brake device may include an operating lever 48, and means is provided to operate this brake as may be required to control rotation of the wheel thereof when a tire is mounted thereon and being buffed in the machine. The brake operating means in the present instance includes an elastic band 49, connected to the outer end of the arm 48, and extended upwardly therefrom and engaged on one of a multiplicity of anchorage members 50 provided on the side of the vertical member of the frame 30 in a convenient position to allow the band 49 to be hooked on any one of them, to apply the necessary braking force to the lever 48. Other means may be provided as discretion may dictate, for operating the brake as required, which will be readily understood.

On the outer end of the tire carrying arm 40, a nut member 51 is mounted at the upper side, and on the upper side of the carriage 42 a similar nut member 52 is mounted, one of these nut members having a right hand thread and the other having left hand threads. A worm shaft 53 is engaged in the nut members, having corresponding right and left hand threads at its respective ends, and having fixed on its outer end a hand wheel 54, by rotation of which the carriage may be shifted longitudinally on the arm 40 to move the tire 47 toward or away from the buffing disc 24.

The structure shown in Figure 5 illustrates diagrammatically how a curved peripheral surface may be attained by the use of a curved pattern 60 which travels against a cam roller 61 to produce a curved crown on the peripheral surface parallel to the curve of the pattern 60. The bar 62 will be attached to the mounting and thus pattern 60 is made to travel parallel to the crown of the tire.

Figure 6 illustrates how a curved crown surface may be attained by the use of an adjustable slotted hinge joint 63 with one end 64 attached to the buffing frame and the opposite end 65 secured to the tire mounting. The joint 63 includes a wing nut and bolt 66 for quick adjustability. An operator may produce the curved surface best suited to a particular tire by adjusting the hinge joint 63 by means of the wing nut and slotted joint construction.

In Figure 7 a construction is illustrated whereby the buffing device may be mounted on a pivoted frame somewhat similar to that shown in Figure 1. In this instance, the motor is moved along a circular path 67 and that it is stationed slightly off center so that the tire does not contact the center of the wheel. The tire is maintained stationary with the exception that it may travel toward and from the buffer wheel similar to that shown in Figure 1.

Figure 8 illustrates a circular trackway 68 having abrupt turns 69 opposite the shoulders of a tire being operated upon, permitting the production of a curved peripheral surface as well as quick adjustability to shoulder operations.

Operation

In the use of this invention, a set of wheels 46 may be provided to accommodate a sufficient range of sizes of tires, which it is desired to repair. The wheel rims may be of a construction adapted for quick mounting and demounting of tire shoes, and for the inflation of an air tube within a shoe when mounted upon the wheel. When a tire is to be trimmed for retreading, the wheel 54 is operated to draw the carriage 42 outward a sufficient distance, and a wheel 46 of the proper size being engaged upon the hub 45 and secured, with the tire mounted thereon and properly inflated, the motor 18 is moved until the pointer 26' indicates on the scale 28 the approximate standard size of the tire mounted upon the wheel, as to its cross sectional diameter. The wheel 54 is then operated to move the carriage inwardly, so as to bring the tire periphery into light engagement with the disc 24, the hand wheel 36 being operated so as to bring the plane of the wheel approximately into alinement with the axis of the shaft 23. The friction exerted by the compression of the knuckles by the nuts and washers 39 will then hold the wheel in this position until it is desired to move it. It should be noted that the arm 40 is positioned at such a level that the axis of the wheel 46 is slightly lower yet very nearly intersected by a geometrical projection of the axis of shaft 23, so that the tire engages slightly below the center of the tackwheel, and that the framework of the machine is so constructed that axis 22 is very nearly intersected by a geometrical projection of the shaft 23 so that the point of contact will be slightly to one side of the abrasion wheel. This point of contact is selected once and for all by the designer and is never again adjusted; furthermore, the position does not vary to any noticeable degree during buffing operations. It is quite obvious that the tire will contact the abrasion wheel at the point nearest the axis 22 and at the point opposite the axis of the wheel upon which it turns. This setting is such as will produce a moderately steady rotation of the tire against the abrasion wheel.

The motor being set in operation, the wheel 46 is rotated, or permitted to rotate, so that the central portion of the tread is buffed completely therearound by turning oscillating wheel 36 until a perfect peripheral center zone is formed, concentric to the axis 22 which is always in direct alignment with the center of the tire tread. It is in this respect that adjustability and accuracy are combined in a novel way to aid the operator in automatically buffing the tread contour to a correct depth from shoulder to shoulder. This center hinge arrangement removes the danger of a varied depth of cut common to prior machines because of shimmy produced by uneven wear and out of round condition common to all tires. It will be noted that shimmy on the pivot frame does not vary the depth of the cut.

After a predetermined setting of the motor slide according to the scale indicating the tire size to be buffed, and the proper contact on the peripheral surface has been attained by adjusting the sliding carriage with the wheel 54 and proper depth of cut has been thus attained on a central zone concentric with the axis of the pivoted frame, by rocking the carriage, or tire support, from side to side by the wheel 36, the operator will have completed the most important operation in tire buffing, and will have done it almost automatically. If a simple top cap is to be used, the above operations will have completed the job.

While, in event of a camel-back cap, it will be necessary to proceed further by backing the tire in the carriage away from the abrasion wheel until the cross-sectional axis of the casing is near the pivot axis 22 as shown in Figure 1, and the operator proceeds further by sliding the motor and tack-wheel in contact with the shoulder of the tire, which is being oscillated by manual means in a narrow limit confined solely to the removal of the front shoulder of the tire. After this front shoulder design has been properly removed, it is then necessary to reverse the motor and oscillate the tire in the pivoted frame until the back shoulder comes in contact with the abrasion wheel, after which a similar manual movement of wheel 36 is employed to oscillate the rear shoulder against the abrasion wheel until it is finished identically to match the other shoulder of the tire. It is very important that both shoulders of the tire be buffed identically perfect and my machine is an answer to that problem. It will also be noted that during all above described buffing operations the point of contact of the tire against the abrasion wheel does not vary to any noticeable degree.

A novel function of this device is the ability of the operator to turn the shoulder of the tire against the edge of the tack-wheel, and thereby produce a shoulder margin which serves as a wall or form to confine the new rubber within its bounds, and thereby prevent overflow during the molding process. This is a new achievement and cannot be obtained by prior machines.

During the course of buffing operations, variations of contact have a tendency to vary the speed of the rotation of the tire against the abrasion wheel, which may be governed by regulating the brake tension by adjusting the band or spring 49, or may be regulated by an automatically operated governor unit, powered to the hub of the wheel 46. Owing to the fact that a portion of disc 24 is moving at a relatively slow speed while another part is moving much faster, the differential between these parts will approximate the peripheral speed of the tire and the device is so arranged that the correct speed of rotation is almost invariably attained without the use of a brake. The tacks or spines are so varied in their circular travel that they shred and intershred the face of the tire in almost every direction at the same time, and thus there is an absence of circumferential, or transverse grooves upon the tire which are prevalent in event of the use of the drum type abrasion wheel on prior machines. By the use of my disc abrasion wheel, a velvety, soft, and numerously pitted surface is presented and in addition, there is gained that advantage, that that tendency of the tacks or spines to become set in one direction is counteracted by the occasional reversing of the disc for certain operations, and thus the efficiency of the disc is greatly enhanced and its life prolonged.

While I have described in great detail a specific embodiment of my invention, it will be understood that this is purely exemplary, and that various modifications in the construction, arrangement, proportions of parts and substitutions of equivalents may be made without departing from the spirit of the invention, and falling within the scope of the appended claims hereto appended.

I claim:

1. A machine of the character described, comprising a base frame, a tire carrying frame pivoted thereon, a rack sector on the base frame concentric with the pivot of said tire carrying frame, means on the tire carrying frame engaged with said rack and operative to move the pivoted frame, manual means to operate the frame, a carriage on the pivoted frame having means to mount a tire thereon revoluble on the major axis of the tire, with the tire plane coincident with the pivot axis of the pivoted frame, said carriage mounted for movement parallel to said plane of the tire, for movement of the periphery across and beyond said pivot axis, a tire buffing member having a substantially flat face presented toward the position of the periphery of a tire in said carriage, a mounting therefor constructed for movement of said buffing member toward and away from said tire, means to move and secure said carriage to predetermined positions on its mounting, and means to move and secure the buffing member on its mounting.

2. A tire dressing machine comprising an upright frame, a pair of vertically spaced arms on the frame, one of said arms having a rack sector, a tire carrying frame pivoted to the arms for swinging movement on a vertical axis, a carriage slidably mounted on the tire carrying frame, means to reciprocate the carriage device and to secure it at adjusted positions, a rotary abrasive device mounted for movement toward and away from the slidable carriage, gear means on the tire carrying frame in mesh with the rack sector, and means for manually rotating the gear means.

3. The structure of claim 2 in which the rotary abrasive device is positioned at a level above the axis of the carriage device.

4. A tire dressing machine comprising an upright frame, an abrasive device on the upright adapted to rotate in a vertical plane and having an abrasive face on its outer side for engaging a tire, an arm on the upright above the horizontal axis of the abrasive device and an arm therebelow, a tire carrying frame pivoted between the arms for swinging movement on a vertical axis, a carriage slidably mounted on the tire carrying frame having its longitudinal axis below the axis of the abrasive device, and means to reciprocate the carriage device and secure it at adjusted positions.

RANDOLPH R. POLLOCK.